United States Patent [19]

Kuip

[11] Patent Number: 4,753,194
[45] Date of Patent: Jun. 28, 1988

[54] CATTLE FEEDING STATION

[75] Inventor: Antonius Kuip, Groenlo, Netherlands

[73] Assignee: N.V. Nederlandsche Apparatenfabriek NEDAP, Groenlo, Netherlands

[21] Appl. No.: 871,446

[22] Filed: Jun. 6, 1986

[30] Foreign Application Priority Data

Jun. 10, 1985 [NL] Netherlands ............... 8501662

[51] Int. Cl.⁴ .................................. A01K 1/00
[52] U.S. Cl. .......................... 119/27; 119/61; 119/155
[58] Field of Search ............ 119/27, 57, 52 AF, 52 B, 119/14.03, 155, 61, 63

[56] References Cited

U.S. PATENT DOCUMENTS

| 2,858,800 | 11/1958 | Babson | 119/27 |
| 4,196,418 | 4/1980 | Kip et al. | 340/152 T |
| 4,362,127 | 12/1982 | Nielson et al. | 119/27 |
| 4,419,961 | 12/1983 | Vandenberg et al. | 119/27 |
| 4,508,059 | 4/1985 | Anderson | 119/27 |
| 4,617,876 | 10/1986 | Hayes | 119/27 |

FOREIGN PATENT DOCUMENTS

| 2535214 | 2/1976 | Fed. Rep. of Germany . |
| 102079 | 8/1962 | Netherlands . |
| 6610164 | 1/1968 | Netherlands . |
| 8104575 | 5/1983 | Netherlands . |

Primary Examiner—David A. Scherbel
Assistant Examiner—Caroline D. Dennison
Attorney, Agent, or Firm—Merchant, Gould, Smith, Edell, Welter & Schmidt

[57] ABSTRACT

A cattle feeding station comprising two side walls between which an animal to be fed can be present, at least one end wall shutting off one end of the feeding station, a feeding trough located at the end, including an identification system for identifying an animal present in the feeding station and further including computer-controlled fodder dispenser. The end wall is formed at least substantially by the feeding trough, which is movable in such a manner that the end wall, under control of appropriate operating means, can be brought into a position shutting off the feeding station, wherein the trough is accessible to an animal present in the feeding station, and into at least one other position leaving the end of the feeding station concerned open and wherein the trough is inaccessible to an animal present in the feeding station.

15 Claims, 2 Drawing Sheets

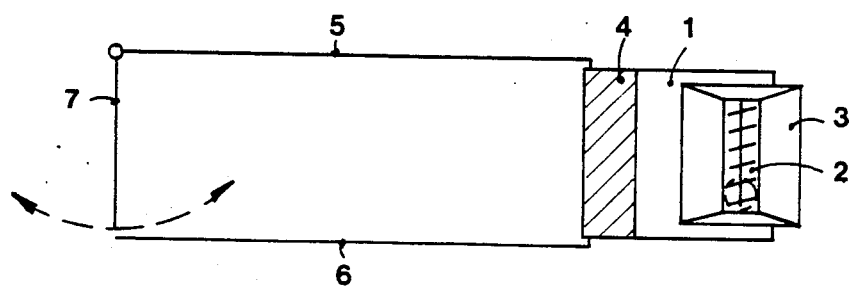
PRIOR ART FIG. 1
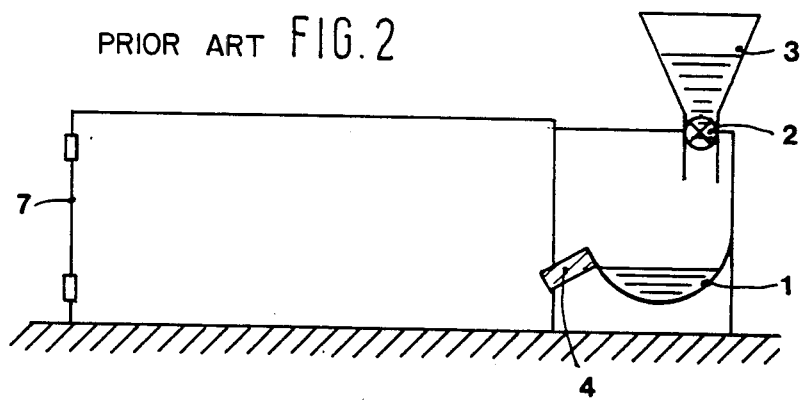
PRIOR ART FIG. 2

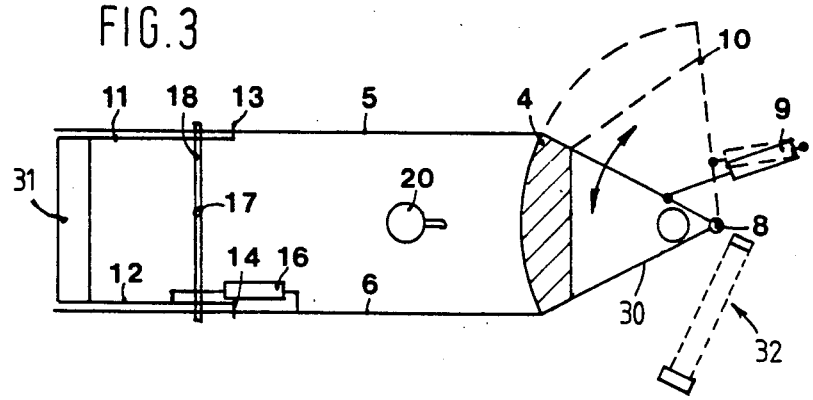
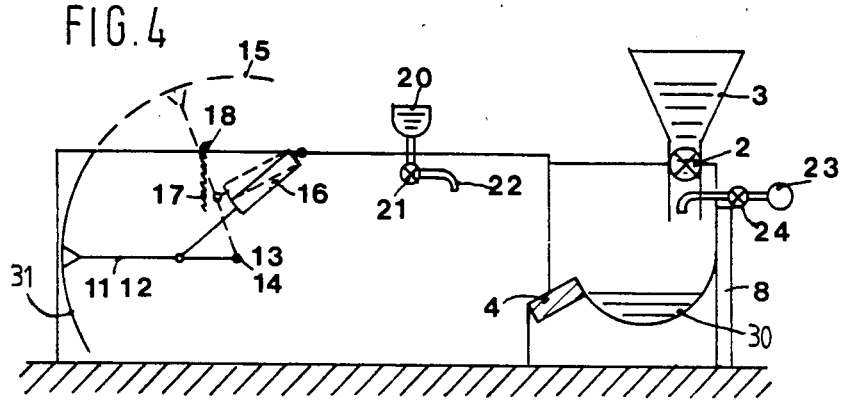
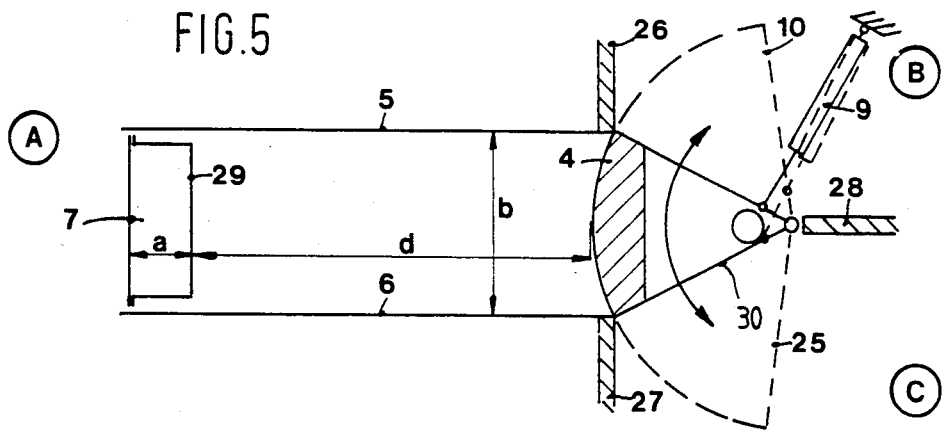

CATTLE FEEDING STATION

The present invention relates to a cattle feeding station comprising two side walls between which an animal to be fed can be present, at least one end wall shutting off one end of the feeding station, a feeding trough located at the said end, including an identification system for identifying an animal present in the feeding station and further including a computer-controlled fodder dispenser.

A similar station is known in practice. The operation of such a known feeding station is as follows. During the feeding period of the animals to be fed, the animals are present at the entrance of one or more feeding stations. The entrance of a feeding station is located opposite the said end wall and may include a door. When a feeding station is free, one of the animals to be fed will move into the station. As soon as the animal inserts its head into the feeding trough, it is identified by the identification system. To this end, each animal is wearing a responder mostly hanging from the neck, wherein, under the influence of an electromagnetic interrogation field produced by the said system, there is generated a code signal that is unique for the animal in question and which is detected by the said system. An embodiment of such an identification system, and in particular a responder therefor, is described e.g. in U.S. Pat. No. 4,196,418.

The identification system is connected to, or fitted with, a computer which, after identification of the animal present in the feeding station, and on the basis of further data fed into the computer store by the cattle farmer, determines the quantity and, possibly, the type of fodder the animal should receive. The computer, to this effect, applies control signals to the fodder dispenser, which subsequently supplies the desired quantity and type of fodder to the feeding trough.

In this manner a great many animals can be fed automatically by means of one or more such feeding stations.

A drawback of the above described prior art feeding station is that an animal that has finished eating has to leave the feeding station backwards. This backward movement is a drawback of the otherwise simple station. On the one hand, the animal is not inclined to leave the station, since more fodder might be supplied, so that it will linger a little while. Moreover, hungry animals will often have gathered at the entrance of the feeding station, which will impede or in any case delay the backward movement of the animal in the feeding box, while, moreover there is a substantial amount of unrest in the cattle house and the animals may even become aggressive. From the viewpoint of efficiency, a maximum number of animals will be fed with one feeding station. Delay in the eating cycle by lingering in the feeding box and slowly moving backwards against the resistance of the animals therebehind should thus be opposed.

In the feeding station according to the present invention, both reasons for delaying the departure from the station by the animal have been minimized.

To this effect, according to the present invention, a feeding station of the above described type is characterized in that the end wall is formed at least substantially by the feeding trough and is arranged movably in such a manner that the end wall under control of appropriate operating means, can be brought in a position closing the feeding station, wherein the feeding trough is accessible to an animal present in the feeding station and in at least one position leaving the end of the feeding station concerned open, wherein the feeding trough is inaccessible to an animal present in the feeding station.

As a result of this construction, an animal, after having eaten, can leave the feeding station in forward direction, so that the next animal can enter the feeding station more quickly. Moreover, the reason for an animal to linger in the feeding station has been removed in that at the end of the eating cycle, the feeding trough or at any rate the entrance opening thereof, is brought out of reach and out of the field of view of the animal, so that it immediately notices that it will not get any more fodder.

Some embodiments of the feeding station according to the present invention will now be described, by way of example, with reference to the accompanying drawings, in which:

FIG. 1 is a diagrammatic top view of a prior art feeding station;

FIG. 2 is a lateral view of the feeding station of FIG. 1;

FIG. 3 is a diagrammatic top view of a first embodiment of a feeding station according to the present invention;

FIG. 4 is a lateral view of the feeding station of FIG. 3 and

FIG. 5 is a diagrammatic top view of a second embodiment of a feeding station according to the present invention.

The prior art station shown in FIGS. 1 and 2 comprises a stationary feeding trough 1 from which fodder can be eaten, with a superimposed dispenser 2 and a supply container 3. By means of the radiographic detector 4, the animal, e.g. a pig, wearing e.g. a collar with a detection means (a so-called responder) is identified, since this responder, arriving in the vicinity of the electromagnetic interrogation field of detector 4, will transmit a code unique for the animal concerned. This code is processed in a computer so that it is decided automatically, in a manner predetermined by the catle breeder, whether the animal is entitled to any fodder, and if so, how much, after which the dispensing of the fodder can be started.

In order to prevent the eating animal from being disturbed, such a feeding station is usually fitted with two side walls 5 and 6 and sometimes also with an entrance door 7, which is closed as soon as the animal is present within the feeding box thus produced.

When the animal has finished eating, the entrance door 7 will be opened under computer control, with the animal leaving the feeding station in backward direction.

FIGS. 3 and 4 show a first embodiment of a feeding station according to the present invention. The station shown includes again side walls 5, 6, a feeding trough 30 disposed at the one end, said trough having again a detector 4 for a responder. At the entrance end of the feeding station there is provided in this embodiment a door 31, which may be constructed as a single door, two half-doors, one hanging door or as a sliding door. In the embodiment shown, use is made of a specially formed door which occupies little space and which will be further described hereinafter.

The feeding trough 30 in this embodiment, as seen in top view, has a substantially triangular form the front of which, proximal to the feeding station, as shown, may have a curved shape. At the apex of the triangular feeding trough, distal from the feeding station, it is mounted for pivotal movement about a vertical shaft 8. In the eating position, the feeding trough entirely closes the feeding station and the fodder present in the trough is accessible to an animal present in the feeding station.

It is observed that the front of the trough may alternatively have a smaller width than the width of the feeding station, in which case it would be incorporated in an end wall further shutting off the feeding station.

The trough is also connected to an operating member 9 which, as shown, may be a hydraulic or pneumatic cylinder which, on energization will rotate the trough about the vertical shaft 8 into such a position that an animal present in the feeding station can leave the station in forward direction. Such a position is shown at 10 in broken lines. In this position, the fodder is out of reach of the animal. Preferably, the side walls of the trough are closed, so that any fodder remaining in the trough is no longer visible to the animal, so that it will leave the feeding station rapidly.

Operating member 9 is energized preferably automatically e.g. under computer control. For instance, the operating member can be energized a predetermined period of time after an animal present in the feeding station has been identified and the fodder has been supplied to the trough, so as to open the exit of the station. The predetermined period of time, if desired, may depend on the quantity of fodder received by the animal. Subsequently, e.g. after a second predetermined period of time, the trough may be returned to the closing position, while at the same time the entrance of the feeding station is opened.

The closing of the exit and the opening of the entrance, if desired, may also be controlled, starting from signals provided by a separate detector arranged adjacent the exit of the station. To this effect, e.g. a light barrier or a depression contact may be disposed in the floor in the path of exit of the animal. Such a light barrier is indicated diagrammatically at 32 in FIG. 3.

It is observed that the fodder supply device 2,3 can be mounted, at choice, either for it to rotate along with the trough or for it to be in a stationary position. In the latter case, the fodder supply device has such a high position that the trough can rotate freely about the vertical shaft 8.

It is further observed that the exit of the feeding station may alternatively be arranged to be cleared by sliding the trough along the vertical shaft 8 in upward direction.

According to a preferred embodiment of the feeding station according to the present invention, the entrance is provided with an access door 31 as shown in FIG. 4. Door 31 includes a bent plate attached to arms 11,12 extending along the side walls 5,6 and having pivots 13,14. Door 31 can be swung upwards into the position 15 shown in broken lines, e.g. moved by an air cylinder 16. To teach the animal to leave the feeding box quickly, one or more depending chains 17 may be fitted on a cross rod 18 to which, after a given delay period, short, harmless voltage pulses are applied as in an electric fence installation. The animal could also be pushed on mechanically to ensure that it leaves the feeding box.

Besides, the feeding station shown may be provided with a marker, e.g. consisting of a dye container 20, electric magnet valve 21 and outlet 22. Valve 21 can be opened through computer control so that the animal then present in the feeding box receives a colour mark, allowing it to be separated subsequently from the herd, e.g. in connection with the state of fertility of the animal. A further extension of the feeding station shown may be a liquid dispenser 23, by means of which a liquid (e.g. water) is supplied via a magnet valve 24 to the usually solid fodder. This increases the eating speed considerably, while also feeding trough 1 remains cleaner, thereby preventing fodder rests from getting mouldy.

FIG. 5 shows an embodiment similar to that of FIGS. 3 and 4, with the added possibility of separating the animals. The feeding trough 30 can now not only be moved into position 10 but also into a second position 25, e.g. by means of the air cylinder 9. When the cattle house is divided into three parts A, B and C by means of partitions or fences 26, 27, 28, an animal coming from A via the feeding station can be conducted selectively into space B or C by placing the trough, after eating, in position 25 or in position 10. In this manner e.g. fertile or sick animals can be isolated from the rest of the herd by computer control.

Naturally, this station, too can be provided with an ousting device 17, 18, marker 20, 21, 22 and liquid dispenser 23,24 possibly with various dyes indicating the required treatment or care. Besides, FIG. 5 shows how the depth d of the feeding station can be reduced and thereby adjusted to the length of the animal. To that end, a filler 29 can be attached against the door 7 in a simple manner, e.g. by means of screwed bolts with wing nuts. This filler extends along at least a part of the height of the door. By using fillers of different depths a (obtained possibly by adjustability) the effective length d of the station can be adjusted as desired.

Also the width b of the feeding station can be made adjustable, if desired, in an otherwise known manner not further indicated by rendering partitions 5 and/or 6 movable in the width direction b of the station.

The feeding station described makes it possible to effectively feed animals partly or entirely automatically, with a short eating cycle, so that relatively many animals can be fed with one feeding station. After the above description, various modifications are obvious to one skilled in the art, which are deemed to fall within the scope of the present invention.

What I claim:

1. A cattle feeding station having an entrance end and an exit end, comprising:
   (a) two longitudinal side walls between which an animal can be present;
   (b) a rear end wall located at said exit end, said end wall being substantially formed from a feeding trough which is movable by operating means in such a manner that the end wall can be brought into a first position shutting off said feeding station in which said trough is accessible to the animal, and can be brought into a second position which leaves said exit end of said feeding station open and which makes said trough inaccessible to the animal;
   (c) a computer-controlled fodder dispenser located above said feeding trough; and
   (d) detector means for identifying the animal in said feed station, said detector means actuating said computer-controlled fodder dispenser so that the amount and type of fodder dispensed can be varied according to the particular animal.

2. A feeding station according to claim 1, further comprising a front end wall proximate said entrance end, said front end wall being movable between an open position which allows the animal to enter said feeding station, and a closed position which shuts off said feeding station.

3. A feeding station according to claim 1, wherein said rear end wall of the station is entirely formed by the feeding trough.

4. A feeding station according to claim 1, wherein the feeding trough, seen in top view, has substantially the form of an isosceles triangle, with the third side of the triangular form being proximal to the interior of the feeding station when the end wall is in the first position and with the trough end distal from the feeding station being mounted on a vertical shaft.

5. A feeding station according to claim 4, wherein the trough is mounted for rotation relative to the vertical shaft.

6. A feeding station according to claim 4, wherein the trough is mounted for up and down movement relative to the vertical shaft.

7. A feeding station according to claim 2, wherein the operating means are adapted to selectively rotate the trough from the closed position of the feeding station into either of two possible open positions so as to force an animal leaving the station in either of two possible directions.

8. A feeding station according to claim 1, wherein said entrance end includes attachment means for a filler to be installed on the inside, by means of which the internal length of the feeding station can be reduced.

9. A feeding station according to claim 1, wherein said entrance end includes a closure portion having two parallel arms, each extending along a side wall of the station, said arms having their ends distal from the closure portion mounted on the sidewalls for pivotal movement about a horizontal shaft and having their other ends connected to the closure portion, there being provided operating means connected to at least one of the arms for rotating the arms with the closure portion about the horizontal shaft for opening and closing the entrance end.

10. A feeding station according to claim 1, further comprising energizable aids which are energized after the clearance of the exit of the feeding station to encourage the animal present in the station to leave the station.

11. A feeding station according to claim 10, wherein the aids comprise a carrier disposed across the feeding station and from which are suspended a plurality of flexible electrical conductors connected to an electric shock signal source.

12. A feeding station according to claim 10, wherein the aids comprise a mechanical push member.

13. A feeding station according to claim 1, further comprising an automatically controlled colour marker for applying a colour mark to an animal present in the feeding station.

14. A feeding station according to claim 1, further comprising an automatically controlled liquid dispenser for supplying liquid to the feeding trough.

15. A feeding station according to claim 1, further comprising a detector installed adjacent the exit of the feeding station for detecting the passage fo an animal and transmitting a signal for the operating means of the end wall.

* * * * *